United States Patent
Berg et al.

(10) Patent No.: US 10,216,864 B1
(45) Date of Patent: Feb. 26, 2019

(54) FAULT-CAPABLE SYSTEM MODELING AND SIMULATION

(75) Inventors: Joel Berg, Bolton, MA (US); Krishna Tamminana, Westborough, MA (US); Jagadish Gattu, Westborough, MA (US)

(73) Assignee: The MathWorks, Inc., Natick, MA (US)

( * ) Notice: Subject to any disclaimer, the term of this patent is extended or adjusted under 35 U.S.C. 154(b) by 1360 days.

(21) Appl. No.: 13/430,017

(22) Filed: Mar. 26, 2012

(51) Int. Cl.
    *G06F 17/50* (2006.01)

(52) U.S. Cl.
    CPC .......... *G06F 17/50* (2013.01); *G06F 17/5009* (2013.01); *G06F 2217/78* (2013.01)

(58) Field of Classification Search
    None
    See application file for complete search history.

(56) References Cited

U.S. PATENT DOCUMENTS

| | | | | |
|---|---|---|---|---|
| 7,315,805 | B2 * | 1/2008 | Slater | 703/19 |
| 2004/0249885 | A1 * | 12/2004 | Petropoulakis | G06F 9/54 |
| | | | | 709/204 |
| 2011/0246831 | A1 * | 10/2011 | Das | G06F 17/504 |
| | | | | 714/37 |
| 2013/0096902 | A1 * | 4/2013 | Bose | G01R 31/318357 |
| | | | | 703/14 |

OTHER PUBLICATIONS

"Developing a fault tolerant power-train control system by integrating design of control and diagnostics". International Journal of Robust and Nonlinear Control Int. J. Robust Nonlinear Control 2001.*
"Bayesian Statistical Model Checking with Application to Stateflow/Simulink Verification". Apr. 12-15, 2010.*
"SimPowerSystems for Use with Simulink" User's Guide, Version 4. The Mathworks. Copyright 1998-2004.*
Maki, Yunosuke, and Kenneth A. Loparo. "A neural-network approach to fault detection and diagnosis in industrial processes." Control Systems Technology, IEEE Transactions on 5.6 (1997): 529-541.*
Rouvray, P., et al. "The application of Matlab to railway signalling system fault modelling." The Use of Systems Analysis and Modelling Tools: Experiences and Applications (Ref. No. 1998/413), IEE Colloquium on. IET, 1998. Jul. 1-8.*
Apostoaia, Constantin M. "Multi-domain system models integration for faults detection in induction motor drives." Electro/Information Technology (EIT), 2014 IEEE International Conference on. IEEE, 2014.*

(Continued)

*Primary Examiner* — Aniss Chad
*Assistant Examiner* — Nithya J. Moll
(74) *Attorney, Agent, or Firm* — Harrity & Harrity, LLP

(57) ABSTRACT

A computing device may be used to create a model that includes a block. The block may represent a function corresponding to a simulation and capable of operating in a fault operational mode. The computing device may also, or alternatively, associate a fault scenario, corresponding to the model, with the fault operational mode of the block. Additionally, or alternatively, the computing device may simulate the fault scenario based on the block diagram model.

51 Claims, 10 Drawing Sheets

(56) References Cited

OTHER PUBLICATIONS

Hashimoto, Masafumi, et al. "Sensor fault detection and identification in dead-reckoning system of mobile robot: interacting multiple model approach." Intelligent Robots and Systems, 2001. Proceedings. 2001 IEEE/RSJ International Conference on. vol. 3. IEEE, 2001.*

MathWorks: Simulink—Modeling a Fault-Tolerant Fuel Control System; retrieved online at: http://www.mathworks.com/products/stateflow/demos.html?file=/products/demos/stateflow/sldemo_fuelsys/sldemo_fuelsys.html; print date Mar. 26, 2012; 8 pages.

NASA HL-20 with FlightGear Interface—MATLAB; retrieved online at: http://www.mathworks.com/help/aeroblks/examples/nasa-hl-20-with-flightgear-interface.html; print date: Mar. 26, 2012; 2 pages.

3-Phase Fault (SimPowerSystems); retrieved online at: http://www.itu.dk/stud/speciale/segmentering/Matlab6p5/help/toolbox/powersys/3phasefault.html; print date: Mar. 26, 2012; 3 pages.

* cited by examiner

FIG. 7

| FAULT SCENARIO MAP | | |
|---|---|---|
| FAULT SCENARIO IDENTIFIER | OPERATIONAL MODE IDENTIFIER | FAULT TYPE |
| 1 | 1 | NULL |
| 2 | 1 | NULL |
| 3 | 2 | BLOWN FUSE CAPABLE |
| 4 | 3 | BLOWN FUSE |
| 5 | 2 | BLOWN FUSE CAPABLE |
| ⋮ | ⋮ | ⋮ |

700

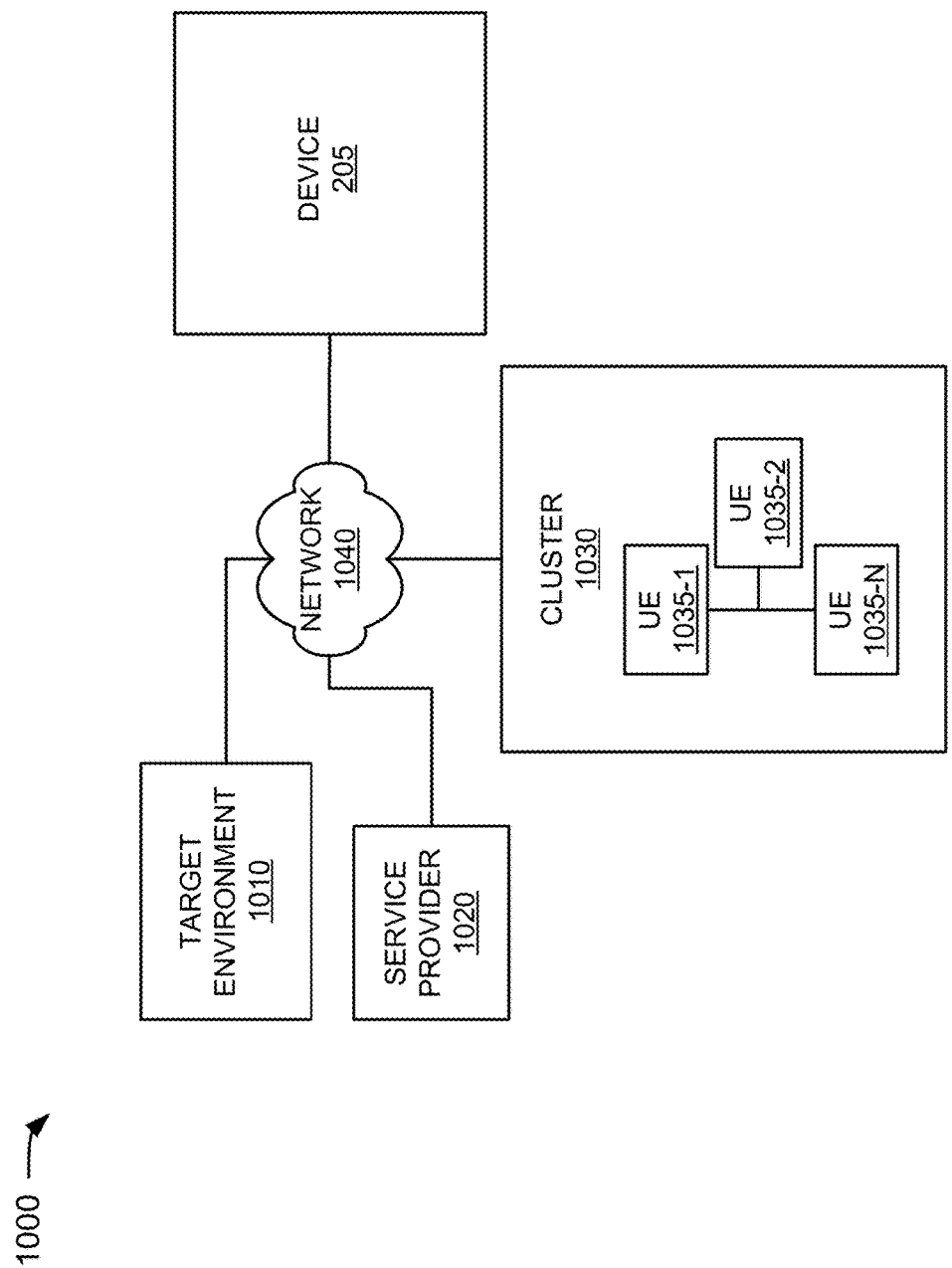

FAULT-CAPABLE SYSTEM MODELING AND SIMULATION

BRIEF DESCRIPTION OF THE DRAWINGS

FIG. 7 is a diagram of an example fault scenario map according to one or more implementations described herein;

FIG. 10 is a diagram of an example distributed network in which systems and/or methods described herein may be implemented.

DETAILED DESCRIPTION OF PREFERRED EMBODIMENTS

The following detailed description refers to the accompanying drawings. The same labels and/or reference numbers in different drawings may identify the same or similar elements.

A block diagram may represent a system. A device may simulate the system by executing the block diagram. However, currently available technologies for simulating systems do not include adequate solutions for simulating faulty systems.

An example implementation, described herein, includes a user device that enables a user to create a model (e.g., a block diagram model) corresponding to a particular system, device, process, etc. Based on the model, the user device may be used to create a simulation that operates in a manner consistent with the particular system, device, process, etc. In some examples, the user device may be connected to, or otherwise include, one or more additional devices, which may enhance or help create the simulation. For instance, the user device may be connected to an electronic circuit board and one or more electronic probes, which the user may interact with to communicate with the user device and engage with the simulation.

Figure 1:
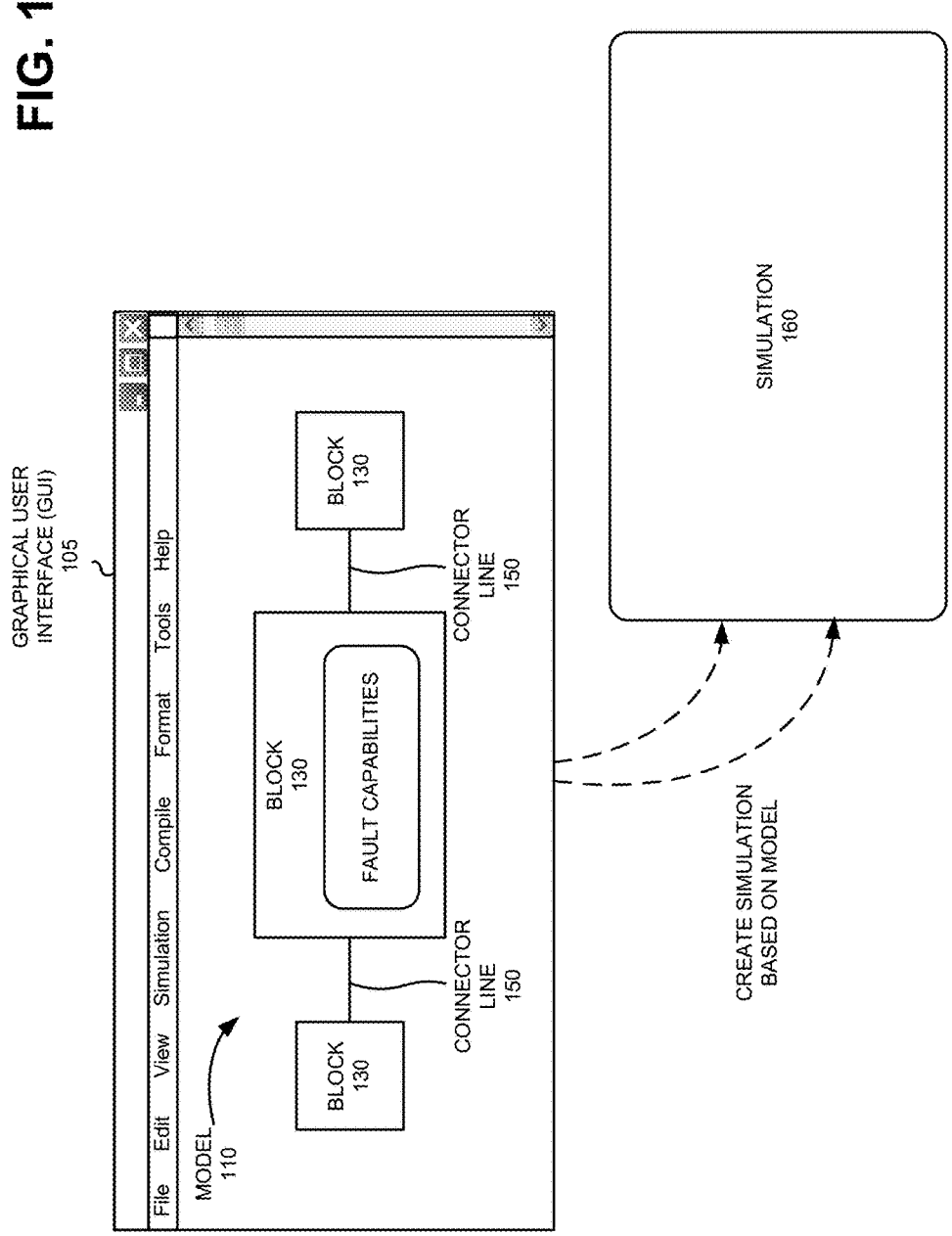
FIG. 1 is a diagram of an example overview of an implementation described herein.

FIG. 1 is a diagram of an example overview of an implementation described herein. The example overview includes a graphical user interface (GUI) 105, a model 110, blocks 130, connector lines 150, and a simulation 160. The GUI 105 may be provided to enable a user to create model 110. Model 110 may provide a visual representation of one or more systems, devices, processes, phenomena, operations, features, or mechanisms corresponding to one or more disciplines or domains (e.g., mathematics, science, engineering, medicine, economics, business, etc.). For instance, model 110 may correspond to an electrical circuit, a hydraulic system, an internal combustion engine, etc. As such, model 110 may include model components, such as blocks 130, that may be connected by connector lines 150, as depicted in the example of FIG. 1. The model components may each perform one or more functions depending on the nature of the model component and the model as a whole. Connector lines 150 may represent energy values, power values, signal values, etc.

Model 110 may be used to create simulation 160 based on model 110 (e.g., the functionality of blocks 130, connector lines 150, etc) and/or another type of information. As one example, blocks 130 may include electrical circuit components (e.g., relays, connectors, switches, etc.) and/or other types of components (e.g., an electrical motor) used in operating an elevator door, and model 110 may be used to create a simulation of the elevator door and/or the electrical circuit components represented by blocks 130. In some implementations, the simulation may include, for example, a GUI generated by a user device (e.g., a desktop computer). However, in other implementations, the simulation may also include devices (e.g., a motor, an electronic circuit board, and electronic probes or other measuring devices) connected to, and capable of communicating with, the user device providing the GUI.

Additionally, or alternatively, blocks 130 and/or other types of model components may be capable of operating according to modes of operation. For instance, a block 130 may be capable of operating according to a standard operational mode and/or a fault operational mode. A standard operational mode may correspond to a mode of operation where the component represented by block 130 is operating properly, and a fault operational mode may include a mode of operation where the component represented by block 130 is broken or otherwise operating improperly.

A block 130 may operate according to a fault operational mode based on a user input, e.g., a user designating the block 130 to operate according to the fault operational mode. Additionally, or alternatively, a block 130 may operate according to a fault operational mode based on, for example, operating conditions during a simulation (e.g., a block 130 representing a circuit fuse is overloaded because an improper level of voltage is applied during the simulation). Further, the standard operational modes and fault operational modes of a particular block 130 may be associated with fault scenarios corresponding to model 110. In some implementations, one or more connector lines 150 may also, or alternatively, be subject to fault operational modes in the same, or similar, manner as blocks 130. One or more fault capable connector lines may be provided in a model library.

Accordingly, since blocks 130 and/or other model components may be capable of operating according to modes of operation (e.g., standard operational modes and fault operational modes), an implementation described herein may provide solutions for creating realistic simulations (e.g., simulations that operate in a manner consistent with physics, chemistry, mathematics, etc.) that include systems, devices, processes, phenomena, operations, features, or mechanisms that are broken or are somehow operating improperly. Furthermore, since one or more of the implementations described herein enable fault operational modes of a particular block to be associated with fault scenarios corresponding to a particular model, a user may create multiple, fault-capable simulations based on a single model.

Figure 2:
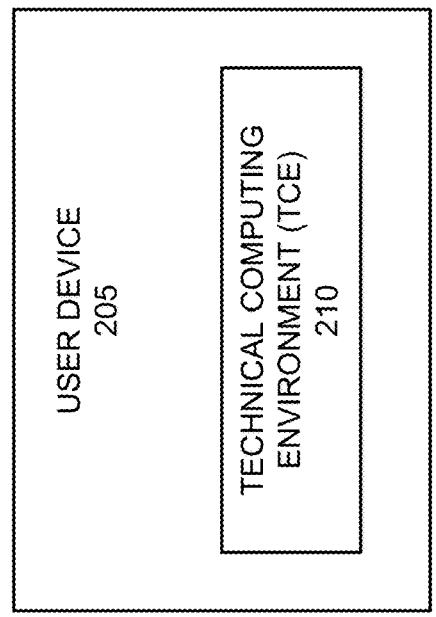
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a user device 205. While FIG. 2 includes particular devices, in alternative implementations, environment 200 may include additional devices, different devices, or differently arranged devices than depicted in FIG. 2.

User device 205 may include a computational device. For example, user device 205 may include a server, a workstation, a mainframe, a computer (e.g., a desktop computer, a laptop computer, a tablet, etc.), and/or some other type of computational device (e.g., a smartphone). As illustrated in the example of FIG. 2, user device 205 may include a technical computing environment (TCE) 210.

TCE 210 may include hardware-based logic and/or a combination of hardware and software-based logic that provides a computing environment. The computing environment may permit a user to perform tasks related to a discipline or a domain. For example, the computing environment may pertain to mathematics, science, engineering, medicine, business, and/or another type of discipline or domain.

TCE 210 may include a dynamically typed language (e.g., a dynamically typed programming language) that can be used to express problems and/or solutions in mathematical notations. For example, TCE 210 may use an array as a basic element, where the array may not require dimensioning. In addition, TCE 210 may perform matrix and/or vector formulations that can be used for data analysis, data visualization, application development, modeling, algorithm development, simulation, training, testing, etc. These matrix and/or vector formulations may be used in many areas, such as statistics, finance, image processing, signal processing, control design, plant modeling, life sciences, education, discrete event analysis and/or design, state based analysis and/or design, etc.

TCE 210 may further provide mathematical functions and/or graphical tools (e.g., for creating plots, surfaces, images, models, volumetric representations, etc.). In an implementation, TCE 210 may provide these functions and/or tools using toolboxes (e.g., toolboxes for signal processing, image processing, data plotting, parallel processing, etc.). Additionally, or alternatively, TCE 210 may provide these functions as blocks or block sets. Additionally, or alternatively, TCE 210 may provide these functions in another way, such as via a catalog or a library. For example, in some implementations, an array of blocks may be provided in a library (e.g., a model library) that a user may use to identify and/or include blocks in a given model.

TCE 210 may include a user interface for creating, compiling, executing, analyzing, validating, etc., a model of a system. TCE 210 may provide an environment for modeling the system. For example, TCE 210 may include a graphical-based environment, a textual-based environment, and/or a hybrid environment (e.g., a combination of graphical and textual environments).

TCE 210 may connect, access, and/or interface with other software applications, data, devices, and/or other types of resources during a modeling process and/or a simulation process. For instance, in some implementations, user device 205 may include, or be in communication with, a device (e.g., an electronic circuit, a particular type of measurement or sensor device, a power source, etc.) that may assist in developing a particular model and/or producing a simulation (also referred to herein as a "simulated environment") corresponding to the particular model. As such, user device 205 and/or TCE 210 may include a wide variety of systems and devices.

Figure 3:
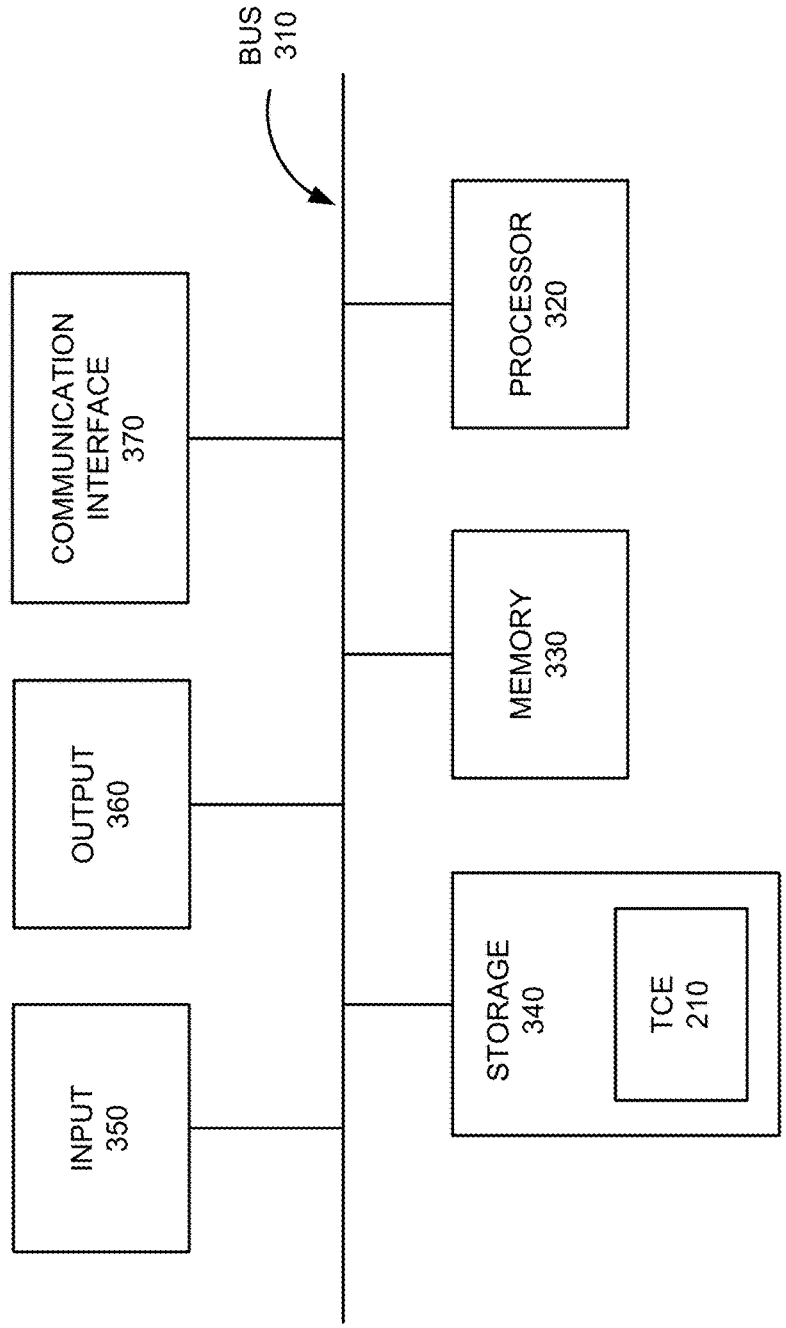
FIG. 3 is a diagram of example components of a user device according to one or more implementations described herein.

FIG. 3 is a diagram of example components of user device 205 according to an implementation described herein. As shown in FIG. 3, user device 205 may include bus 310, processor 320, memory 330, storage 340, input 350, output 360, and/or communication interface 370. In other implementations, user device 205 may include fewer components, additional components, different components, and/or a different arrangement of components than those depicted in FIG. 3. Additionally, or alternatively, one or more components of user device 205 may perform one or more acts described as being performed by one or more other components of user device 205.

Bus 310 may permit communication among the other components of user device 205. For example, bus 310 may include a system bus, an address bus, a data bus, and/or a control bus. Bus 310 may also include bus drivers, bus arbiters, bus interfaces, and/or clocks.

Processor 320 may interpret and/or execute instructions. For example, processor 320 may include a general-purpose processor, a microprocessor, a data processor, a graphical processing unit (GPU), a co-processor, a network processor, an application specific integrated circuit (ASIC), an application specific instruction-set processor (ASIP), a system-on-chip (SOC), a controller, a programmable logic device (PLD), a chipset, and/or a field programmable gate array (FPGA).

Memory 330 may store data and/or instructions related to the operation and use of user device 205. For example, memory 330 may store data and/or instructions that may be configured to implement an implementation described herein. Memory 330 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 340 may store data and/or software related to the operation and use of user device 205. For example, storage 340 may include a hard disk (e.g., a magnetic disk, an optical disk, a magneto-optic disk, a solid state disk), a compact disc (CD), a digital versatile disc (DVD), a floppy disk, a cartridge, a magnetic tape, and/or another type of computer-readable medium, along with a corresponding drive. Memory 330 and/or storage 340 may also include a storing device external to and/or removable from user device 205, such as a Universal Serial Bus (USB) memory stick, a hard disk, etc. In an implementation, as illustrated, storage 340 may store TCE 210.

Input 350 may permit the user and/or another device to input information into user device 205. For example, input 350 may include a keyboard, a keypad, a touchpad, a mouse, a display (e.g., a touch screen), a button, a switch, a microphone, voice recognition logic, an input port, and/or some other type of input component. Output 360 may permit user device 205 to output information to the user and/or another device. For example, output 360 may include a display, a speaker, a light emitting diode (LED), a haptic feedback device, a tactile feedback device, an output port, and/or some other type of output component.

Communication interface 370 may permit user device 205 to communicate with other devices, networks, and/or systems. Communication interface 370 may include a transceiver-like component. For example, communication interface 370 may include an Ethernet interface, an optical interface, a coaxial interface, a radio interface, and/or some other type of wireless and/or wired interface.

As will be described in detail below, user device 205 may perform certain operations relating to implementations described herein. User device 205 may perform these operations in response to processor 320 executing software instructions (e.g., computer program(s)) contained in a computer-readable medium, such as memory 330 and/or storage 340. A computer-readable medium may be defined as a non-transitory memory device. A memory device may include space within a single physical memory device or spread across multiple physical memory devices. The software instructions may be read into memory 330 from another computer-readable medium, such as storage 340, or from another device via communication interface 370. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
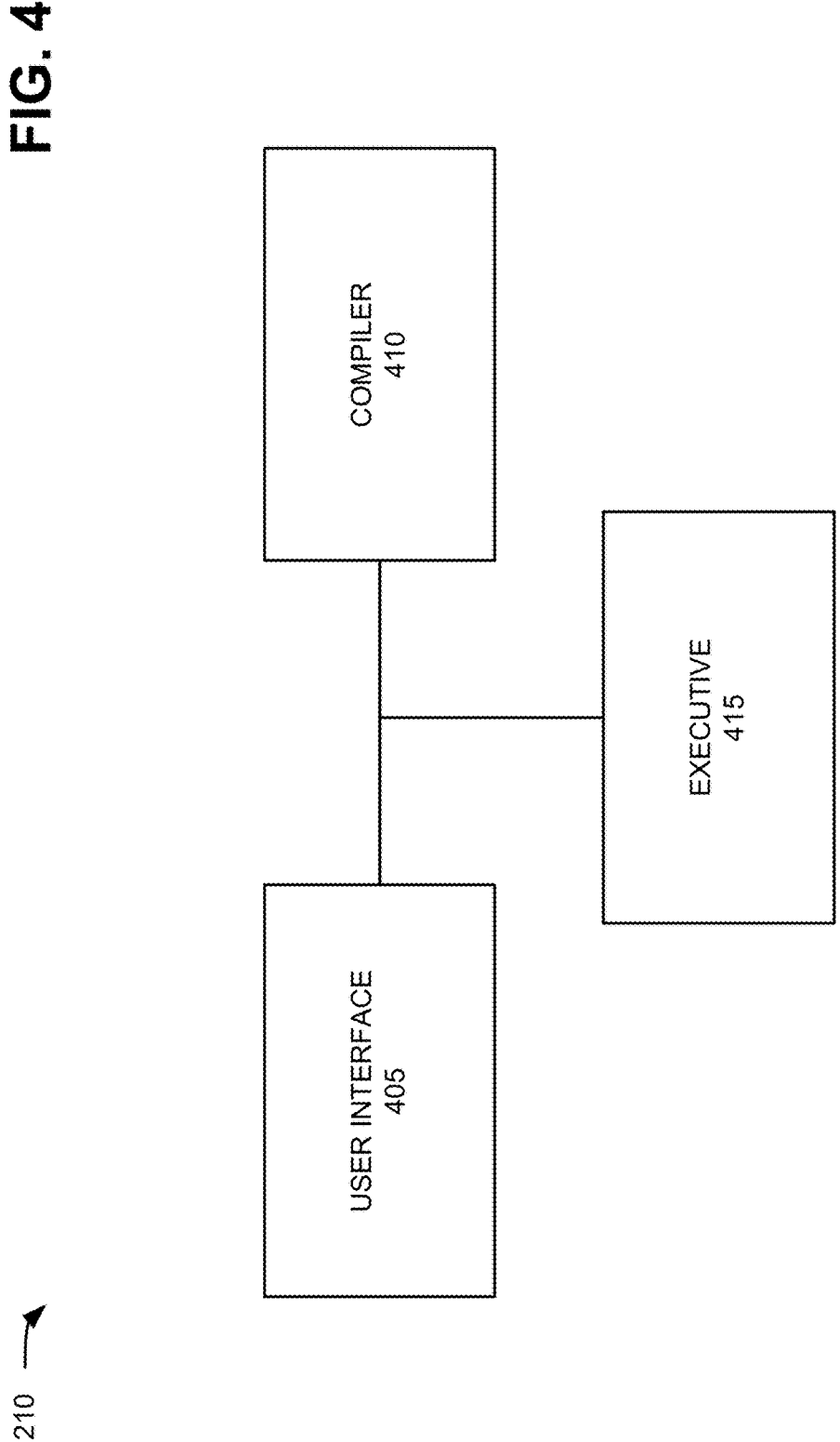
FIG. 4 is a diagram of example functional components of a technical computing environment (TCE) according to one or more implementations described herein.

FIG. 4 is a diagram of example functional components of TCE 210 according to one or more implementations described herein. TCE 210 may include, for example, a user interface 405, a compiler 410, and an executive 415. In other implementations, TCE 210 may include fewer functional components, additional functional components, different functional components, and/or a different arrangement of functional components than those illustrated in FIG. 4. The functions described in connection with FIG. 4 may be performed by one or more of the components of user device 205 depicted in FIG. 3.

User interface 405 may include logic to provide an interface that aids a user in creating, compiling, executing, and/or analyzing a model of a system. User interface 405 may provide libraries that include predefined entities that may be used to create the model. Additionally, or alternatively, user interface 405 may permit user-defined entities to be created and used when creating the model. For example, user interface 405 may include predefined blocks and/or permit user-defined blocks to be created and used when creating the model of the system.

Compiler 410 may include logic to provide a transformation of information associated with the model to an alternative form. For example, compiler 410 may convert the model into an internal representation that allows the executive 415 to execute the model (e.g., represented by a block diagram) in an interpreted mode. In particular, compiler 410 may convert the graphical description embodied by the model (e.g., a block diagram) into an internal form, allocate data structures for the memory, generate an order of execution, and then execute the pre-written versions of the elements in the model (e.g., the blocks in the block diagram). Compiler 410 may also convert the model into an internal representation which then allows the generation of code which may then be executed in another executable environment.

For example, compiler 410 may generate code (e.g., executable code, target code, intermediate code, etc.) that corresponds to the model. The code may be generated as a textual language (e.g. C/C++) which will then be further compiled and linked into an executable program directly executable by an operating system, including, but not limited to, an operating system on which TCE 210 may be running. For example, compiler 410 may transform the model into generated code in the form of a hardware description language (HDL), which can be used to synthesize custom hardware.

Compiler 410 may perform various operations to generate the code. For example, compiler 410 may prepare data structures, evaluate parameters, configure and propagate component characteristics, determine component connectivity, determine signal compatibility, etc., associated with the model. In one implementation, compiler 410 may convert the model into an executable form, which may be executed. In other implementations, compiler 410 may generate an internal representation of the model for execution in an interpreted mode, and/or compiler 410 may generate textual code for further execution in another environment.

The executable form of the model may include, for example, an executable image, object code, a library, and/or some other form. The executable form of the model may also include code generated (e.g., in a textual language or byte code) that is not executable directly by the operating system (e.g., of TCE 210), but runs in another environment (e.g., Java, Perl, MATLAB code, or other interpreted languages). Compiler 410 may permit the user to select a target platform for the generated executable code. Executive 415 may include logic to execute, run, and/or simulate the executable form of the model and output a result (e.g., a simulation) of the executed model.

In other implementations, TCE 210 may also import and/or access a stored model that was created in another environment, such as, but not limited to, another TCE 210. The imported and/or stored model may then be compiled, executed, etc. For example, the Simulink Coder™ software application by The MathWorks, Inc. may generate and execute C and C++ code for models created in the Simulink software application, also by The MathWorks, Inc.

Figure 5:
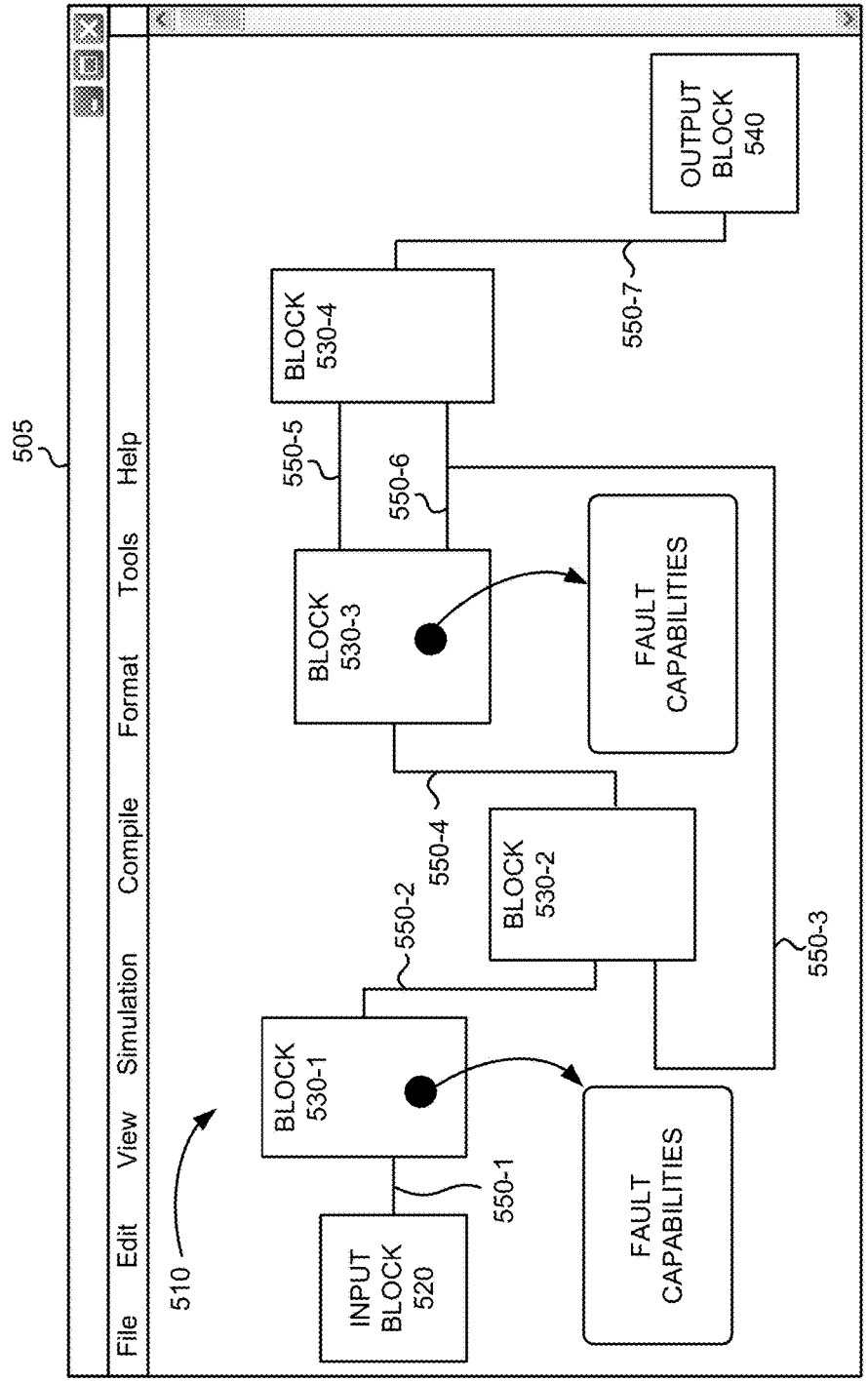
FIG. 5 is an example model in an example graphical user interface (GUI) according to one or more implementations described herein.

FIG. 5 is an example model 510 in an example GUI 505 according to one or more implementations described herein. User interface 405 may provide GUI 505 in which a user may create model 510. Model 510 may include an input block 520, blocks 530-1, 530-2, 530-3, and 530-4 (hereinafter referred to collectively as "blocks 530," and individually as "block 530"), and an output block 540. Input block 520, blocks 530, and output block 540 may be interconnected via connector lines 550-1, 550-2, 550-3, 550-4, 550-5, 550-6, and 550-7 (hereinafter referred to collectively as "connector lines 550," and individually as "connector line 550"). As described below, connector lines 550 may represent a logical connection, a functional connection, and/or a physical connection between input block 520, blocks 530, and/or output block 540.

Input block 520 may represent a type of block that provides an input signal to model 510 and/or enables block 530-1 to execute. For example, input block 520 may execute part of its function and directly, or indirectly, cause block 530-1 to execute part of its function, by providing an input signal (e.g., a signal value) to block 530-1 via connector line 550-1. Similarly, block 530-1 may enable block 530-2 to execute part of its function by providing an input signal to block 530-2 via connector line 550-2. However, the type of operation performed by block 530-2 may also, or alternatively, be dependent upon, or otherwise affected by, an input from block 530-3 via connector line 550-3.

Block 530-3 may receive the input from block 530-2 and may provide an input signal to block 530-4 via connector line 550-5 and/or via connector line 550-6. Block 530-4 may receive the input signal from block 530-3 and provide an input signal to output block 540 via connector line 550-7. Output block 540 may receive the input signal from block 530-4 and transmit an output signal (not shown in FIG. 5) to another model, another block, a storage medium, and/or a destination device. For instance, output block 540 may cause user device 205, or a component thereof, to generate a representation, such as a simulation, an effect within a simulation, or some other type of representation, based on the output signal.

As depicted, one or more of blocks 530 may be capable of operating in a fault operational mode. As mentioned above, a fault operational mode may include a mode of operation where the component corresponding to block 530 is broken or is otherwise operating improperly. For example, let us assume that model 510 corresponds to an electrical circuit and block 530-1 corresponds to a particular electrical circuit component, such as an electrical fuse. In such a scenario, the user may configure block 530-1 to operate as though the fuse had been blown, as though the fuse was manufactured poorly (e.g., has an unexpectedly high resistance), as though the fuse was designed poorly (e.g., used inferior materials), or as though the fuse had some other type fault. In some implementations, because of the interconnectedness between blocks 530, configuring block 530-1 to operate in a faulty manner may not only alter the individual behavior of block 530-3 within model 510, but may also alter the individual behavior with respect to one or more other blocks 530 within model 510.

In some implementations, blocks 530 may be associated with a fault scenario to enable a user to run multiple, distinct simulations based on the same model 510. For instance, a user may create a first fault scenario corresponding to model 510, where block 530-1 and block 530-3 each operate in a standard operational mode. The user may also create a second fault scenario that also corresponds to model 510, where block 530-1 operates in a standard operational mode, but block 530-3 operates in a fault operational mode. The user may create a third fault scenario that corresponds to model 510, where block 530-1 operates in a first fault operational mode and block 530-3 operates in a first fault operational mode. The user may create a fourth fault scenario that corresponds to model 510, where block 530-1 operates in a first fault operational mode and block 530-3 operates in a second, different fault operational mode. Accordingly, the operational modes of one or more of blocks 530 may be associated with one or more fault scenarios to enable a user to run multiple, distinct simulations based on a single model 510.

In one example, block 530 may include or otherwise correspond to a non-causal modeling function or operation. An example of a non-causal modeling function may include a function, operation, or equation that may be executed in different fashions depending on an input, a circumstance, and/or a condition. Said another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally described a directionally consistent signal flow from input block 520 to output block 540, in other implementations, the interactions between blocks 530 may not necessarily be directionally specific or consistent.

For example, while input block 520 provides an input signal to block 530-1 via connection 550-1, block 530-1 may provide an input signal to input block 520 via connection 550-1. In the electrical domain, input block 520 may correspond to a battery and block 530-1 to a resistor. The battery represented by input block 520 may provide an input voltage to drive the resistor represented by block 530-1 via connection 550-1. The function of the block 530-1 that represents the resistor may then be enabled to compute a current drawn by the resistor. The current may be provided as input to the battery as represented by input block 520 via connection 550-1. The current may be used by part of the function performed by the battery represented by input block 520 to determine a future input voltage.

In some implementations, block 530 may also, or alternatively, operate in accordance with a rule or a policies corresponding to model 510. For instance, if model 510 were intended to behave as an actual, physical system or device, such as an electronic circuit, blocks 530 may be required to operate within, for example, the laws of physics (also referred to herein as "physics-based rules"). Requiring models 510 and/or model components to operate in accordance with such rules or policies may help ensure that simulations based on such models will operate as intended.

Model 510 is provided for explanatory purposes only. In practice, model 510 may include more blocks, fewer blocks, different blocks, and/or differently arranged blocks. Similarly, model 510 may include different connections between blocks. Additionally, or alternatively, although model 510 is represented as a block diagram, depending on the environment, model 510 may include a different type of diagram, a textual representation, a hybrid representation (e.g., software components and hardware components or textual and graphical representations), etc.

Figure 6:
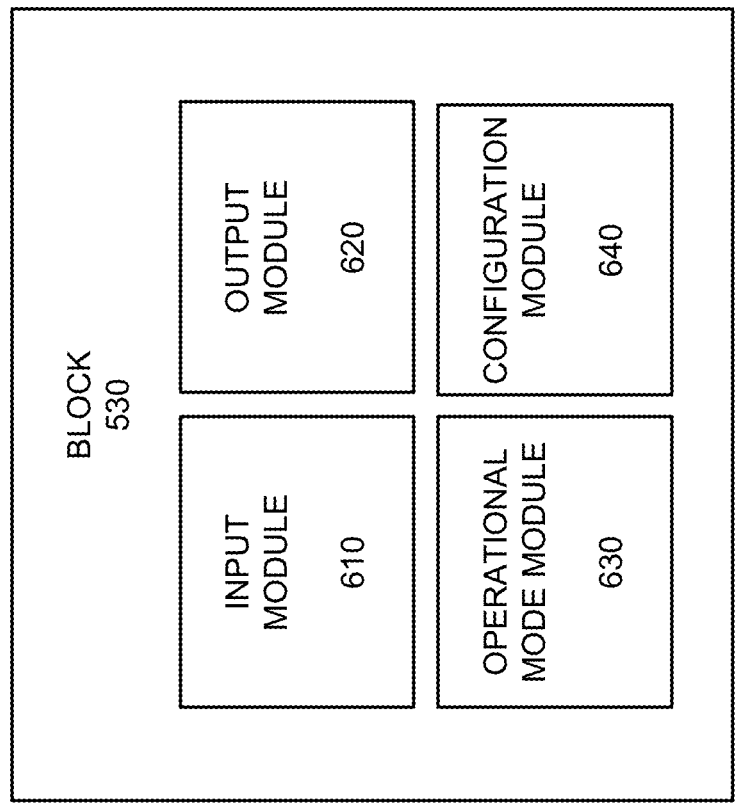
FIG. 6 is a diagram of example functional components of a block according to one or more implementations described herein.

FIG. 6 is a diagram of example functional components of a block 530 according to one or more implementations described herein. As depicted, block 530 may include an input module 610, an output module 620, an operational mode module 630, and a configuration module 640. Depending on the implementation, one or more of modules 610-640 may be implemented as a combination of hardware and software based on the components illustrated and described with respect to FIG. 3. Alternatively, modules 610-640 may each be implemented as hardware based on the components illustrated and described with respect to FIG. 3.

Input module 610 may provide functionality with respect to receiving a signal, an input, or another type of information. For example, as described above with reference to FIG. 5, block 530 may receive an input from another block 530 via a connector lines 550. As such, in some implementations, while block 530 may be visually connected to other blocks 530 in a particular model, input module 610 may provide block 530 with the logical or functional capacity for actually receiving its input.

Similarly, output module 620 may provide functionality with respect to providing a signal, an output, or another types of information. For example, as was also described above with reference to FIG. 5, block 530 may provide or communicate an output to another block 530 via connector lines 550. In some implementations, therefore, while block 530 may be visually connected to other blocks 530 in a particular model, output module 610 may actually provide the logical or functional capacity for providing or communicating an output.

Operational mode module 630 may provide functionality with respect to performing a function or an operation. For example, operational mode module 630 may enable block 530 to perform a function and/or an operation within the context of a particular model 510. In some implementations, the function and/or operation performed by block 530 may be in response to receiving an input signal from a source (e.g., another block 530). Additionally, or alternatively, the type of function and/or operation performed by block 530 may be based on an operational mode of block 530.

As mentioned above, examples of operational modes may include a standard operational mode, a selectable fault mode, and an operationally inflictable fault mode. A standard operational mode may include a mode of operation where block 530 is operating properly within model 510. A selectable fault mode may include a mode of operation, selected by a user, where block 530 is operating improperly within model 510. An operationally inflictable fault mode may include a mode of operation that block 530 may transition into depending upon a simulation condition (e.g., an electrical fuse may be blown if the electrical circuit receives too much voltage during a simulation). As such, operational mode module 630 may enable block 530 to operate according to multiple modes of operation, which may be specified prior to, or during, a simulation that involves block 530.

Configuration module 640 may provide functionality with respect to configuring block 530. For instance, configuration module 640 may enable a user to select or specify an operational mode that block 530 will execute during a simulation. Configuration module 640 may also, or alternatively, enable a user to map or otherwise associate a particular operational mode with a particular fault scenario.

For example, referring to FIG. 7, configuration module 640 may provide a fault scenario map 700 for associating fault scenarios with one or more operational modes of block 530. The fault scenario map 700 may include fault scenario identifiers that are associated with operational modes and fault types. A fault scenario identifier may correspond to or otherwise represent a particular fault scenario corresponding to model 510. An operational mode identifier may correspond to a particular operational mode of block 530 (e.g., a standard operational mode, a selectable operational mode, or an operationally inflictable operational mode). A fault type may provide a description, or descriptive information, corresponding to the operational mode identifier.

Per the example provided in FIG. 7, a single operational mode may be associated with one or more fault scenarios. For example, operational mode identifier "1" is associated with two fault scenarios (fault scenario "1" and fault scenario "2"). As such, in fault scenarios corresponding to fault scenario identifiers "1" and "2," block 530 may behave or operate in a standard operational mode (described by the corresponding fault type, "NULL"). Operational mode identifier "2" is also associated with two fault scenarios (fault scenario "3" and fault scenario "5"). As such, in fault scenarios corresponding to fault scenario identifiers "3" and "5," block 530 may behave or operate in an operationally inflictable fault mode (described by the corresponding fault type, "BLOWN FUSE CAPABLE"). Operational mode "3" is associated with a single fault scenario (fault scenario "4"). As such, in fault scenarios corresponding to fault scenario identifier "4," block 530 may behave or operate in a particular fault mode (per the corresponding fault type, "BLOWN FUSE"). Accordingly, since model 510 may include multiple blocks 530, and each block may be capable of operating in multiple operational modes, providing a fault scenario map 700 for each block 530 may enable a user to run multiple, distinct simulations based on the same model 510. In some implementations, a fault scenario may map onto parameter changes instead of, or in addition to, mapping onto graphical elements.

Figure 8:
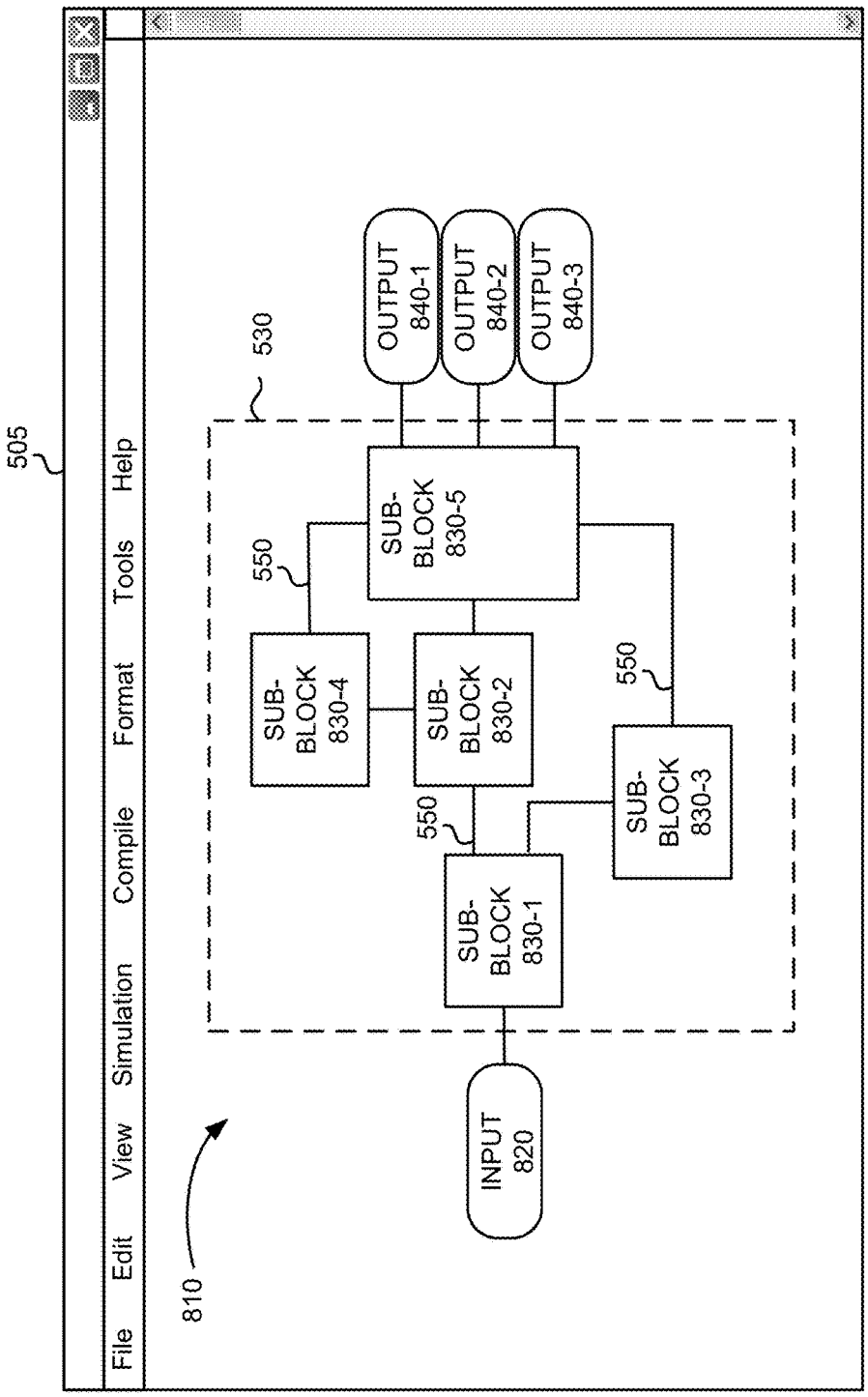
FIG. 8 is a diagram of an example block in an example GUI according to one or more implementations described herein.

FIG. 8 is a diagram of an example block 530 in an example GUI 505 according to one or more implementations described herein. User interface 405 may provide GUI 505 in which a user may create a model 810 of a block 530. Block 530 may include an input 820, sub-blocks 830-1, 830-2, 830-3, 830-4, and 830-5 (hereinafter referred to collectively as "sub-blocks 830," and individually as "sub-block 830"), and outputs 840-1, 840-2, and 840-3 (herein referred to collectively as "outputs 840," and individually as "output 840"). Input 820, sub-blocks 830, and outputs 840 may be interconnected via connector lines 550.

Input 820 may represent an input signal that may cause sub-block 830-1 to execute or otherwise operate. In some implementations, the input signal may be received from another block, device, or other model component. Similarly, sub-block 830-1 may provide a signal to sub-block 830-2 and/or sub-block 830-3. Sub-block 830-2 may provide a signal to sub-block 830-4 and/or 830-5, and sub-block 830-3 may provide a signal to sub-block 830-5. Sub-block 830-5 may provide an output signal to output 840-1, output 840-2, and/or output 840-3. Similar to input 820, output 840-1, output 840-2, and/or output 840-3 may lead to a block, a device, or another type of model component. In addition to, or alternatively, block 530 may include functionality to map its ports (e.g., input, output, or noncausal interface variables) onto the ports of its sub-blocks.

Similar to blocks 530 of discussed above with reference to FIG. 5, sub-blocks 830 may each perform a process, an operations, and/or a function consistent with the overall functionality of corresponding block 530. In some implementations, sub-blocks 830 and the corresponding connector lines 550 may be created via user interface 405. Accordingly, implementations described herein may enable a user to specify the functionality of block 530 in a model 810.

For instance, continuing with the example discussed above with respect to an electrical fuse, using sub-blocks 830 a user may associate block 530 with one or more modes of operation (e.g., a standard operational mode, a selectable fault operational mode, and/or an operationally inflictable fault mode). As an example, signal path or connector line that includes sub-block 830-1, sub-block 830-3, sub-block 830-5, and output 840-3 may provide functionality corresponding to a selectable fault operational mode (e.g., where the user specifies that block 530 must operate as a blown fuse). Sub-block 830-1, sub-block 830-2, sub-block 830-5, and output 840-2 may provide functionality corresponding to a standard operational mode (e.g., where the fuse is operating properly). Sub-block 830-1, sub-block 830-2, sub-block 830-4, sub-block 830-5, and output 840-1 may correspond to an operationally inflictable fault mode (e.g., where the fuse is blown or overloaded during a simulation).

Model 810 is provided for explanatory purposes only. In practice, model 810 may include more sub-blocks, fewer sub-blocks, different sub-blocks, and/or differently arranged sub-blocks. Similarly, model 810 may include different connections between sub-blocks. Additionally, or alternatively, although model 810 is represented as a block diagram, depending on the environment, model 810 may include a different type of diagram, a textual representations, a hybrid representation, etc. Furthermore, model 810 may be a time-based model, an event-based model, a state-based model, a data flow-based model, etc.

For example, model 810 may be a noncausal model. The noncausal model may include differential and algebraic equations and/or may be based on object oriented modeling principles such as, for example, inheritance, polymorphism, and encapsulation. The interface of a noncausal model may be physics based and, for example, include ports with across and through variables. The connection semantics of such that all across variables of connections at one port may be set to be equal while all through variables of connections at one port are balanced (e.g., sum to 0).

In another example, model 810 may be a state transition diagram that may include statechart modeling facilities such as hierarchy, broadcast, and parallelism.

In an embodiment, model 810 may be a combination of a time-based model, an event-based model, a state-based model, a data flow-based model, etc.

Figure 9:
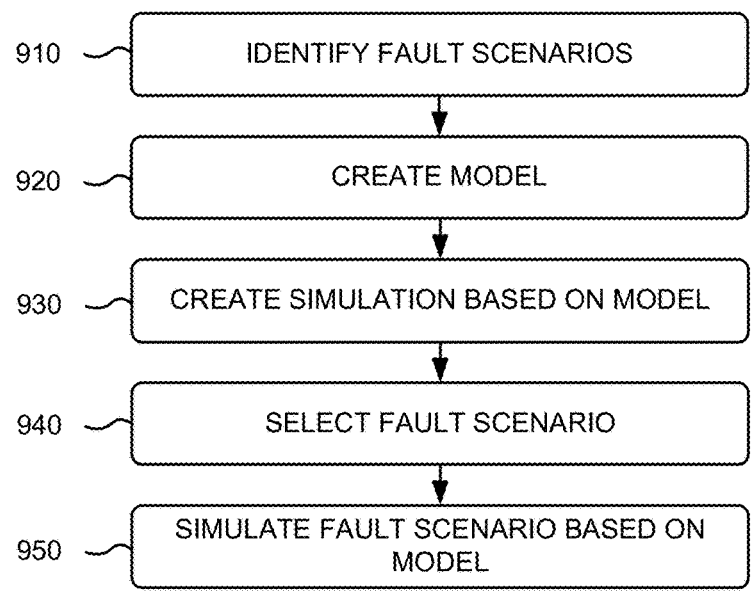
FIG. 9 is a diagram of an example process for creating a fault-capable simulation according to one or more implementations described herein.

FIG. 9 is a diagram of an example process 900 for creating a fault-capable simulation according to one or more implementations described herein. In one implementation, process 900 may be performed by one or more components of user device 205. In other implementations, one or more blocks of process 900 may be performed by one or more other components/devices, or a group of components/devices, including or excluding user device 205.

Fault scenarios may be identified (block 910). For example, a user may identify fault scenarios corresponding to model 510 within TCE 210 and/or user interface 405. The fault scenarios may, for example, specify or identify a dysfunctional component of a system, a device, a process, a phenomenon, an operation, a feature, or a mechanism corresponding to a discipline or domain (e.g., mathematics, science, engineering, medicine, economics, business, etc.).

A model may be created (block 920). For instance, user device 205 may create model 510 using blocks 530 and/or connector lines 550. In some implementations, the model may correspond to the same system, device, process, phenomenon, operation, feature, and/or mechanism as the identified fault scenarios. For example, a user may identify fault scenarios corresponding to a particular system of devices (block 910) and cause user device 205 to create a model corresponding to the same system of devices (block 920). In certain implementations, fault scenarios may also, or alternatively, be identified at some point after model 510 is created by user device 205. In some implementations, user device 250 may create model 510 by creating fault scenarios with model 510. As mentioned above, the fault scenarios may include one or more blocks 530 of model 510 operating in a fault operational mode.

A simulation may be created (block 930). For example, user device 205 may create a simulation based on model 510. In some implementations, the simulation may be created within technical computing environment 210 (e.g., using the same software application that was used to create model 510). User device 205 may also, or alternatively, create the simulation based on another type of information that may result in, for example, a simulation condition, a simulation environment, a simulation behavior, a simulation event, etc. Additionally, or alternatively, user device 250 may create an executable data structure (e.g., an executable software program) that may be executed by user device 205, or another computing or communications device, to create the simulation based on model 510.

A fault scenario may be selected (block 940). For instance, user device 205 may select a particular fault scenario of model 510 to simulate. As depicted in the example of FIG. 9, user device 205 may select the fault scenario subsequent to creating the simulation. However, user device 205 may also, or alternatively, select the fault scenario prior to creating the simulation. In certain implementations, user device 205 may select the fault scenario based on an input received from a user. In some implementations, the particular operational scenario that is selected (e.g., during simulation) may be based on a probability that may be defined by the user.

The fault scenario may be simulated (block 950). For example, user device 205 may simulate a fault scenario corresponding to model 510. In some implementations, user device 205 may simulate the fault scenario by expressing an event or another type of condition or behavior that is consistent with the fault scenario selected. For instance, continuing with the electrical fuse example discussed above, simulating an electrical device with a blown fuse may include expressing a behavior of the electrical device that is consistent with the electrical device having a blown fuse. As is also discussed above, depending on the implementation, the faulty behavior expressed by user device 205 may be a result of a user-selected fault or an operationally inflicted fault.

While FIG. 9 shows a flowchart diagram of an example process 900 for creating a fault-capable simulation, in other implementations, a process for creating a fault-capable simulation may include fewer operations, different operations, differently arranged operations, or additional operations than depicted in FIG. 9. For example, in some implementations, a user of user device 205 may select a fault scenario and/or simulate the fault scenario during, or after, the simulation of another fault scenario. Additionally, or alternatively, a user may cause user device 205 to create an executable data structure corresponding to model 510, simulate a fault scenario corresponding to model 510, and/or provide the executable data structure to another device in order to, for example, enable the other device to create or otherwise produce a simulation and/or a fault scenarios associated with model 510. In some implementations, the executable data structure may correspond to a programming language (e.g., Structured Text, C, C++, Sequential Function Charts, Function Blocks, a programming language corresponding to a particular standard (e.g., a programming standard associated with the International Electrotechnical Commission (IEC)), etc.), and/or a type of executable applications. In some implementations, the executable data structure may be executed by a type of programs, including a multi-domain simulation or model-based design environment, such as Simulink, Simscape, SimPowerSystems, Stateflow, and/or SimEvents, by The MathWorks, Inc.

FIG. 10 is a diagram of an example distributed network 1000 in which systems and/or methods described herein may be implemented. FIG. 10 illustrates an example of a distributed network 1000 in which systems and/or methods described herein may be implemented. Referring to FIG. 10, environment 1000 may contain various entities including device 205, target environment 1010, service provider 1020, cluster 1030, and network 1040. Note that the distributed environment 1000 is just one example of a distributed environment that may be used with embodiments of the invention. Other distributed environments that may be used with embodiments of the invention may contain more entities, fewer entities, entities in arrangements that differ from the arrangement illustrated in FIG. 10, and so on. Moreover, the distributed environments may be configured to implement various "cloud computing" frameworks.

Details of device 205 were described above with respect to FIG. 2. In distributed environment 1000, device 205 may be configured to, among other things, exchange information (e.g., data) with other entities in network 1040 (e.g., target environment 1010, service provider 1020, and cluster 1030). Device 205 may interface with the network 1040 via communication interface 370.

Target environment 1010 may be configured to execute and/or interpret a compiled version of a model which may be generated in or otherwise available to the distributed environment 1000. The network 1040 may include a communication network capable of exchanging information between the entities in the network 1040. The network 1040 may include digital and/or analog aspects. The information may include machine-readable information having a format that may be adapted for use, for example, in the network 1040 and/or with an entity in the network 1040. For example, the information may be encapsulated in one or more packets that may be used to transfer the information through the network 1040.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.10, 802.11, etc.

Network 1040 may comprise various network devices, such as gateways, routers, switches, firewalls, servers, repeaters, address translators, etc. Portions of network 1040 may be wired (e.g., using wired conductors, optical fibers, etc.) and/or wireless (e.g., using free-space optical (FSO), radio frequency (RF), acoustic transmission paths, etc.). Portions of network 1040 may include a substantially open public network, such as the Internet. Portions of network 1040 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

Service provider 1020 may include logic that makes a service available to another entity in distributed environment 1000. Service provider 1020 may also include a server operated by, for example, an individual, a corporation, an educational institution, a government agency, and so on, that provides one or more services to a destination, such as device 205. The services may include software containing computer-executable instructions that implement one or more embodiments of the invention or portions thereof, and may be executed, in whole or in part, by (1) a destination, (2) service provider 1020 on behalf of the destination, or (3) some combination thereof.

For example, in an embodiment, service provider 1020 may provide one or more subscription-based services that may be available to various customers. The services may be accessed by a customer via network 1040. The customer may access the services using a computer system, such as device 205. The services may include services that implement one or more embodiments of the invention or portions thereof. Service provider 1020 may limit access to certain services based on, e.g., a customer service agreement between the customer and service provider 1020.

The service agreement may allow the customer to access the services that may allow the customer to build, execute, and/or analyze a model for a design, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 1030 may include a number of units of execution (UEs) 1035 that may perform processing of one or more embodiments of the invention or portions thereof on behalf of device 205 and/or another entity, such as service provider 1020. UEs 1035 may reside on a single device or chip or on multiple devices or chips. For example, UEs 1035 may be implemented in a single ASIC or in multiple ASICs. Likewise, UEs 1035 may be implemented in a single computer system or multiple computer systems. Other examples of UEs 1035 may include FPGAs, CPLDs, ASIPs, processors, multiprocessor systems-on-chip (MPSoCs), graphic processing units, microprocessors, etc. UEs 1035 may be configured to perform operations on behalf of another entity. Service provider 1020 may configure cluster 1030 to provide, for example, the above-described services to computing device 100 on a subscription basis (e.g., via a web service).

Accordingly, one or more implementations described herein provide solutions for creating fault-capable models and generating fault-capable simulations. Furthermore, since one or more of the implementations described herein enable fault operational modes of a particular block to be associated with one or more fault scenarios corresponding to a particular model, a user may create multiple, fault-capable simulations based on a single model.

As described herein, faults may be prescribed directly by a user and/or determined stochastically according to user-prescribed probabilities at the model level or independent component level. Fault scenarios may be communicated top-down to the component level and may contain faults in multiple components. Fault status may be communicated bottom-up from the component level to the model level and may serve to inform the model or user of component operational status, which can be acted on automatically and/or manually.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

As mentioned above, one or more implementations, described herein, may include a TCE. The TCE may permit a user to, for example, perform tasks related to disciplines, such as, but not limited to, mathematics, science, engineering, medicine, and/or business. The TCE may provide one or more environments for modeling a system. For example, the TCE may include a graphical-based environment, a textual-based environment, and/or a hybrid environment (e.g., a combination of graphical and textual environments). The TCE may connect, access, and/or interface with other software applications, data, devices, and/or other types of resources during a modeling process. Concepts described herein are not dependent upon and/or are limited to a particular type of TCE.

Examples of TCEs that may be modified to incorporate one or more embodiments of the invention include, but are not limited to, the MATLAB®, Simulink®, Stateflow®, Simscape™, and SimEvents®, software applications which are available from The MathWorks, Inc., Natick, Mass.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica and Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; the Eclipse development platform from the Eclipse Foundation; MagicDraw from No Magic, Inc.; CoWare from CoWare, Inc.; and Ptolemy from the University of California at Berkeley.

What is claimed is:

1. A method, comprising:
 associating different subsets of sub-blocks, included in a block, with a plurality of modes of the block,
  the block being included in a model,
  the block representing a function corresponding to a simulation,
  the plurality of modes of the block providing different functionalities when the model is executed,
  the plurality of modes comprising a standard operational mode of the block and a fault mode of the block,
  the fault mode of the block including at least one of:
   a first mode including a dysfunctional mode of operation that is conditional upon one or more simulated operating conditions, or
   a second mode including a dysfunctional mode of operation that is imposed upon the simulation by user selection,
  a different subset of sub-blocks being executed when the block operates in the fault mode than when the block operates in the standard operational mode to generate different results based on a same input into the block,
  where the associating the different subsets of the sub-blocks is performed by a computing device;
 associating each of a plurality of scenarios, corresponding to the model, with a respective mode of the plurality of modes, of the block,
  a first scenario, of the plurality of scenarios, being associated with the standard operational mode of the block,
  a second scenario, of the plurality of scenarios, being associated with the fault mode of the block, and
  where the associating the plurality of scenarios is performed by the computing device;
 converting the model into an executable form of the model,
  where the converting is performed by the computing device; and
 executing the executable form of the model to simulate the plurality of scenarios within at least one of a technical computing environment, a simulation environment, or a target environment,
  the block operating in the standard operational mode by executing a first subset of the sub-blocks associated with the standard operational mode when the first scenario is simulated, the block operating in the fault mode by executing a second subset of the sub-blocks associated with the fault mode when the second scenario is simulated, and
  where the executing is performed by the computing device; and
  where executing the executable form of the model includes, at a time of simulation, at least one:
   identifying a user defined probability that a particular scenario occurs during simulation at a model level or a component level, selecting to simulate the second scenario, associated with the fault mode of the block, based on the user defined probability, and operating the block in the fault mode based on selecting to simulate the second scenario; or
   detecting an operational behavior during the simulation, selecting to operate the block in the fault mode based on the operational behavior detected during the simulation, and operating the block in the fault mode during the simulation.

2. The method of claim 1, where creating the model comprises:
 receiving one or more inputs from a user and producing the model based on the one or more inputs from the user, or
 communicating with another computing device and obtaining the model from the other computing device.

3. The method of claim 1, where the block corresponds to a model library comprising one or more types of model objects.

4. The method of claim 1, where the model includes a plurality of blocks, including the block, that are capable of operating in the plurality of modes,
the method further comprising:
selecting a scenario from the plurality of scenarios corresponding to the model,
each of the plurality of scenarios, including the first scenario and the second scenario, being associated with a respective mode of each of the plurality of blocks.

5. The method of claim 1, further comprising:
creating an executable data structure corresponding to the model,
where the executable data structure is executed by the computing device to simulate the plurality of scenarios.

6. The method of claim 5, where the executable data structure comprises:
logical instructions corresponding to one or more programming languages, or
one or more executable applications.

7. The method of claim 1, further comprising:
creating an executable data structure corresponding to the model; and
providing the executable data structure to another computing device to enable the other computing device to simulate the plurality of scenarios.

8. The method of claim 7, where the executable data structure comprises:
logical instructions corresponding to one or more programming languages, or
one or more executable applications.

9. The method of claim 1, where:
executing the executable form of the model to simulate the plurality of scenarios comprises:
providing the simulation environment consistent with the plurality of scenarios, and
the simulation environment is provided by the computing device, by another computing device, or by a combination of the computing device and one or more other computing devices.

10. The method of claim 1, where creating the model comprises:
creating the model using a particular software application; and
where executing the executable form of the model to simulate the plurality of scenarios comprises:
causing the plurality of scenarios to be simulated using the particular software application.

11. The method of claim 1, further comprising:
generating a simulation based on the model prior to associating each of the plurality of scenarios with the respective mode.

12. The method of claim 1, where executing the executable form of the model to simulate the plurality of scenarios comprises:
expressing a fault behavior, using a differential equation model, corresponding to the fault mode associated with the second scenario.

13. The method of claim 1, further comprising:
associating additional scenarios corresponding to one or more other modes, of the plurality of modes, of the block;
selecting another scenario from the additional scenarios; and
causing the other scenario to be simulated based on the model.

14. The method of claim 13, where causing the other scenario to be simulated comprises:
expressing a fault behavior, using a differential equation model, corresponding to another mode, of the plurality of modes, associated with the other scenario.

15. The method of claim 1, where the function represented by the block comprises:
a non-causal modeling operation that operates in accordance with one or more physics-based rules associated with the model.

16. The method of claim 1, where the fault mode includes the first mode.

17. The method of claim 1, where the fault mode includes the second mode.

18. The method of claim 1, where creating the model further comprises:
configuring the block to operate as though the function is operating improperly.

19. The method of claim 1, where the model is for simulating a behavior of a physical system including at least one of an electrical system, a hydraulic system, or an engine.

20. The method of claim 1, where the operational behavior includes a fuse being blown or overloaded.

21. The method of claim 1, where the model is a time-based model, an event-based model, a state-based model, or a data flow-based model.

22. A user device, comprising:
a memory to store instructions; and
a processor, connected to the memory, to:
associate different subsets of sub-blocks, included in a block, with a plurality of modes of the block,
the block being included in a model,
the block representing a function corresponding to a simulation,
the plurality of modes of the block providing different functionalities when the model is executed,
where the plurality of modes of the block comprise:
a standard operational mode of the block and a fault mode of the block,
where the fault mode comprises:
a dysfunctional mode of operation that is conditional upon one or more simulated operating conditions, or
a selectable fault mode comprising a dysfunctional mode of operation imposed upon the simulation by user selection,
a different subset of sub-blocks being executed when the block operates in the fault mode than when the block operates in the standard operational mode to generate different results based on a same input into the block,
create a mapping between each of a plurality of scenarios, corresponding to the model, and modes of model components included in the model,
the mapping including an association between each of a plurality of scenarios and a respective mode of the plurality of modes of the block,
a first scenario, of the plurality of scenarios, being associated with the standard operational mode of the block, and
a second scenario, of the plurality of scenarios, being associated with the fault mode of the block, and
convert the model into an executable form of the model; and execute, based on respective associations included in the mapping, the executable form of the model to simulate the plurality of scenarios within at least one of a technical computing environment, a simulation environment, or a target environment, the block operating in the standard operational mode by executing a first subset of the sub-blocks associated with the standard operational mode when the first scenario is simulated, and the block operating in the fault mode by executing a second subset of the sub-blocks associated with the fault mode when the second scenario is simulated.

23. The user device of claim 22, where, to create the model, the processor is to:

receive one or more user inputs from a user and produce the model based on the one or more user inputs, or communicate with a computing device and obtain the model from the computing device.

24. The user device of claim 22, where the processor is to:

create an executable data structure corresponding to the model, where the executable data structure is executed by the user device to cause the plurality of scenarios to be simulated.

25. The user device of claim 24, where the executable data structure comprises:

control logic corresponding to one or more programming languages, or one or more executable applications.

26. The user device of claim 22, where the processor is to:

create an executable data structure corresponding to the model; and provide the executable data structure to a computing device to enable the computing device to provide an instance of the simulation.

27. The user device of claim 26, where the executable data structure comprises:

control logic corresponding to one or more programming languages, or one or more executable applications.

28. The user device of claim 22, where, to create the model, the processor is to:

create the model using a software application, and where, to cause the second scenario to be simulated, the processor is to:

cause the second scenario to be simulated using the software application.

29. The user device of claim 22, where the processor is to: generate a simulation based on the model prior to simulating the second scenario.

30. The user device of claim 22, where the processor is to: express a fault behavior, using a differential equation model, corresponding to the fault mode associated with the second scenario.

31. The user device of claim 22, where the processor is to: select another scenario from the plurality of scenarios corresponding to the model, and cause the other scenario to be simulated based on the model.

32. The user device of claim 31, where the processor is to: express a fault behavior, using a differential equation model, corresponding to another mode, of the plurality of modes, associated with the other scenario.

33. The user device of claim 22, where the fault mode corresponds to:

an event-based fault;

a time-based fault;

a cycle-based fault; or a frequency-based fault.

34. The user device of claim 22, where the function represented by the block comprises:

a non-causal modeling operation that operates in accordance with one or more physics-based rules.

35. The user device of claim 22, where the fault mode comprises:

an occurrence probability assigned to the fault mode, where the occurrence probability represents a probability of the function, represented by the block, transitioning from the standard operational mode to the fault mode during the simulation.

36. The user device of claim 22, where the function represented by the block comprises:

a non-causal modeling operation that operates in accordance with one or more physics-based rules associated with the model.

37. The user device of claim 22, where the model is a time-based model, an event-based model, a state-based model, or a data flow-based model.

38. One or more non-transitory computer-readable storage media, comprising:

one or more instructions that, when executed by a processor, cause the processor to:

associate different subsets of sub-blocks, included in a block, with a plurality of modes of the block, the block being included in a model, the block representing a function corresponding to a simulation, the plurality of modes of the block providing different functionalities when the model is executed, the plurality of modes of the block comprising a standard operational mode of the block and a fault mode of the block, the fault mode including at least one of:

a first mode including a dysfunctional mode of operation that is conditional upon one or more simulated operating conditions, or a second mode including a dysfunctional mode of operation that is imposed upon the simulation by user selection, a different subset of sub-blocks being executed when the block operates in the fault mode than when the block operates in the standard operational mode to generate different results based on a same input into the block, associate each of a plurality of scenarios corresponding to the model with a respective mode of the plurality of modes of the block, a first scenario, of the plurality of scenarios, being associated with the standard operational mode of the block, and a second scenario, of the plurality of scenarios, being associated with the fault mode of the block, convert the model into an executable form of the model; and execute the executable form of the model to simulate the plurality of scenarios within at least one of a technical computing environment, a simulation environment, or a target environment based on execution of the executable form of the model that includes the block, the block operating in the standard operation mode by executing a first subset of the sub-blocks associated with the standard operational mode when the first scenario is simulated, the block operating in the fault mode by executing a second subset of the sub-blocks associated with the fault mode when the second scenario is simulated, where the instructions, that cause the processor to execute the executable form of the model, cause the processor to:

communicate a fault status from a component level to a model level, and automatically select to simulate the second scenario, associated with the fault mode of the block, based on the fault status communicated from the component level.

39. The one or more non-transitory computer-readable storage media of claim 38, where, to cause the processor to create the model, the one or more instructions cause the processor to:

receive one or more user inputs from a user and produce the model based on the one or more user inputs, or communicate with a computing device and obtain the model from the computing device.

40. The one or more non-transitory computer-readable storage media of claim 38, where the one or more instructions cause the processor to:

create an executable data structure corresponding to the model, and cause the plurality of scenarios to be simulated by executing the executable data structure.

41. The one or more non-transitory computer-readable storage media of claim 40, where the executable data structure comprises:

logical instructions corresponding to one or more programming languages, or one or more executable applications.

42. The one or more non-transitory computer-readable storage media of claim 38, where the one or more instructions cause the processor to:

cause the plurality of scenarios to be simulated in the simulation environment, the simulation environment being provided by a user device, by another device, or by a collaboration of the user device and one or more other types of devices.

43. The one or more non-transitory computer-readable storage media of claim 38, where the one or more instructions cause the processor to:

create an executable data structure corresponding to the model; and provide the executable data structure to another computing device to enable the other computing device to perform an instance of the simulation.

44. The one or more non-transitory computer-readable storage media of claim 43, where the executable data structure comprises:

logical instructions corresponding to one or more programming languages, or one or more executable applications.

45. The one or more non-transitory computer-readable storage media of claim 38, where the one or more instructions, that cause the processor to create the model, cause the processor to:

create the model using a software application, and where the one or more instructions, that cause the processor to execute the executable form of the model to simulate the plurality of scenarios, cause the processor to cause the first scenario to be simulated using the software application.

46. The one or more non-transitory computer-readable storage media of claim 38, where the one or more instructions cause the processor to:

generate the simulation based on the model prior to simulating the second scenario.

47. The one or more non-transitory computer-readable storage media of claim 38, where the one or more instructions cause the processor to:

express a fault behavior, using a differential equation model, corresponding to the fault mode of the block associated with the second scenario.

48. The one or more non-transitory computer-readable storage media of claim 38, where the one or more instructions cause the processor to:

select another scenario from the plurality of scenarios corresponding to the model; and cause the other scenario to be simulated based on the model.

49. The one or more non-transitory computer-readable storage media of claim 48, where the one or more instructions cause the processor to:

express a fault behavior, using a differential equation model, corresponding to another mode, of the plurality of modes, associated with the other scenario.

50. The one or more non-transitory computer-readable storage media of claim 38, where the function represented by the block comprises:

a non-causal modeling operation that operates in accordance with one or more physics-based rules associated with the model.

51. The one or more non-transitory computer-readable storage media of claim 20, where the model is a time-based model, an event-based model, a state-based model, or a data flow-based model.

* * * * *